Dec. 4, 1928.

J. P. STEVENS ET AL 1,693,828

AUTOMOBILE SERVICE INDICATOR

Filed June 18, 1927

INVENTORS.
JOHN PERCY STEVENS.
GEORGE A. C. BAILEY.
BY
*H. A. Druckman*
ATTORNEY.

Patented Dec. 4, 1928.

1,693,828

UNITED STATES PATENT OFFICE.

JOHN PERCY STEVENS, OF LONG BEACH, AND GEORGE A. C. BAILEY, OF LOS ANGELES, CALIFORNIA; SAID BAILEY ASSIGNOR TO LOUISE PARENTEAU, OF LOS ANGELES, CALIFORNIA.

AUTOMOBILE SERVICE INDICATOR.

Application filed June 18, 1927. Serial No. 199,647.

For the proper operation and maintenance of an automobile, truck, or the like, it is necessary that it be serviced at regular intervals. That is, that the oil in the crank case be changed, that the car be greased, and that water be placed in the battery. At present it is very difficult to accurately determine when the automobile has gone a sufficient number of miles to warrant the above named servicing.

An object of our invention is to provide an indicator whereby it is possible to accurately determine the exact number of miles traveled since the automobile was last serviced.

A further object is to provide an indicator on which is recorded data relative to changing the oil, greasing the car, and placing water in the battery.

Still another object is to provide independent means whereby the vehicle operator can determine when the vehicle was last serviced for either oil, grease, or water in the battery.

A feature of our invention resides in the rapid means whereby the mileage can be recorded at which the car was last greased, or the oil changed therein, or the date upon which water was placed in the battery.

An advantage of our indicator is that it is visible to the operator at all times and can be easily adjusted by him when the car is serviced.

Other objects, advantages, and features of invention may appear from the accompanying drawing, the subjoined detailed description, and the appended claims.

Figure 1:
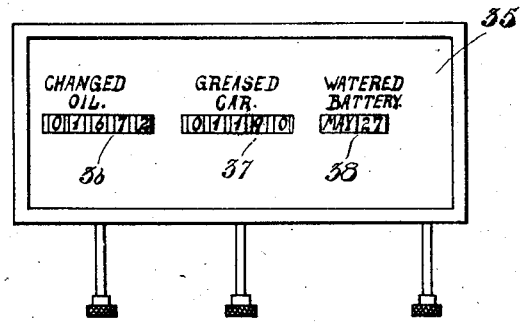
Fig. 1 is a front elevation of our indicator.
Figure 3:
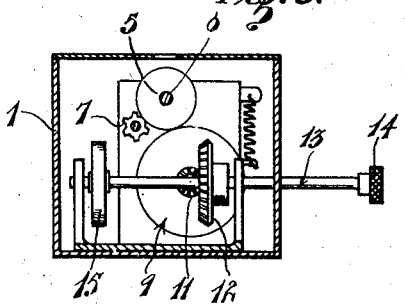
Fig. 3 is a sectional view taken on line 3, 3, of Fig. 2.
Figure 2:
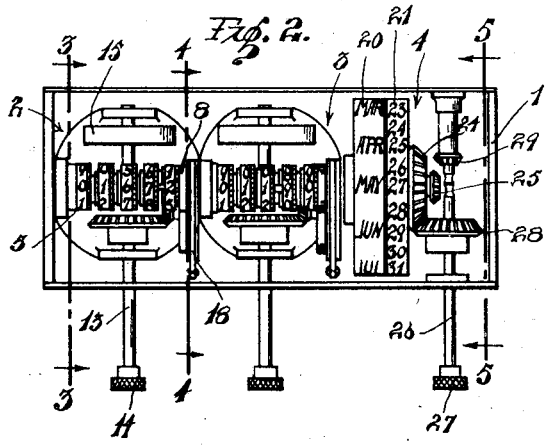
Fig. 2 is a view similar to Fig. 1 but with the face plate removed.
Figure 4:
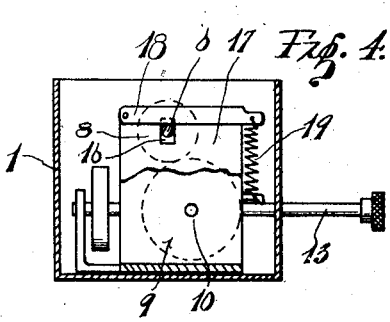
Fig. 4 is a sectional view taken on line 4, 4 of Fig. 2.
Figure 5:
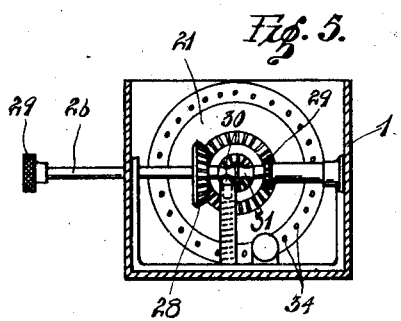
Fig. 5 is a sectional view taken on line 5, 5 of Fig. 2.
Figure 6:
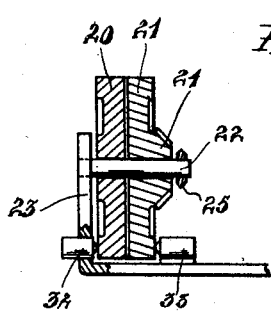
Fig. 6 is a fragmentary transverse sectional view of the date drums.

Referring more particularly to the drawing:

Our indicator comprises a case 1 in which we provide an indicator mechanism for the oil, 2, an indicator mechanism for the grease, 3, and a mechanism 4 indicating when the battery last received water. The mechanism 2 comprises a plurality of numbered discs 5 which are rotatably mounted on a shaft 6 and are successively operated by transfer gears 7, all of which is usual and well-known in the art.

The end disc has secured thereto a friction wheel 8 which is engaged by a friction drive wheel 9 mounted on a shaft 10. A gear 11 secured to the shaft 10 meshes with a drive gear 12 secured to a shaft 13 which extends out of the case 1 and is provided with a knurled button 14 on the outer end thereof, whereby said shaft may be rotated as will be further described.

A balance wheel 15 on the shaft 13 assists in continuing the rotation of said shaft in order that the drive disc 9 and disc 8 may be rapidly rotated to actuate the discs 5 to indicate the proper mileage. In order that the friction discs 8, 9 shall be held constantly in contact, the shaft 6 extends through a slot 16 in the end bearing 17 and an arm 18 is pivoted on the bearing and bears against the top of the shaft 6. A spring 19 secured to the arm 18 urges the same downwardly against the shaft, thus pressing the disc 8 against the drive disc 9 and insuring rotation of the shaft 6.

The construction and arrangement of the mechanism to indicate when the car was greased is identical to that previously described and will not be again described in detail.

It is necessary that the oil in a crank case be changed after a definite number of miles have been traveled by the vehicle and with our indicator when the oil is changed we set the mileage shown on the speedometer upon the discs 5 of the indicator. When this is done it is a simple matter to subtract the mileage shown on the indicator from the mileage shown on the speedometer and thus accurately determine the number of miles traveled since the oil was last changed. A similar method is employed for indicating when the car was last greased although the mileage traversed by the vehicle will be somewhat different for the crank case oil change than for the greasing of the car.

Water is placed in the battery at certain definite intervals, preferably days or weeks apart, and for this purpose we provide a pair of wheels 20, 21, which wheels are mounted on a shaft 22 journaled in a bearing 23. The wheel 20 is secured to the shaft while the wheel 21 is journaled thereon. A gear 24 is secured to the wheel 21 and a gear 25 is secured to the outer end of the shaft 22. A shaft 26 is journaled in the case 1 and extends therefrom, said shaft being provided with a knurled button 27 on the outer end thereof whereby said shaft may be rotated. A pair of gears 28, 29 are secured to the shaft 26 and are adapted to mesh with the gears 24, 25, respectively. The shaft 26 is slidable longitudinally so as to selectively engage the gears 28, 24 or 29, 25, as desired. A yieldable pin 30 engages either of the notches 31 in the shaft 26 to hold said shaft in either of the two positions above stated.

The wheels 20, 21 are held against accidental rotation by yieldable pins 32, 33 which engage the sides thereof, said pins extending into identations 34, thereby more positively holding the wheels. The wheel 20 is provided with the names of the months on the periphery thereof, while the wheel 21 is provided with the numbers of the days of the month on the periphery thereof. Thus it is possible to adjust the month and the day upon which the battery was last watered and it can be readily seen when the battery again needs water.

A cover plate 35 is secured over the case 1 and is provided with slots 36, 37, 38, through which the discs 5 and wheels 20, 21 are visible. Above each of the slots we provide the legends, "Changed oil", "Greased car", and "Watered battery". Our indicator is preferably mounted on the dash of a vehicle and is thus constantly before the operator who can quickly determine whether the vehicle should be serviced.

Having described our invention, we claim:

1. An automobile service indicator comprising a casing, a face plate on the casing, a plurality of numbered discs journaled in the casing, a friction wheel, a friction drive wheel, a shaft journaled in the casing, a balance wheel on the shaft, and gear means connecting said shaft and said friction drive wheel whereby said numbered discs are rotated, said numbered discs being visible under a legend on said face plate.

2. An automobile service indicator comprising a casing, a face plate on the casing, a plurality of numbered discs journaled in the casing, a friction wheel, a friction drive wheel, a shaft journaled in the casing, a balance wheel on the shaft, and gear means connecting said shaft and said friction drive wheel whereby said numbered discs are rotated, said numbered discs being visible under a legend on said face plate, and yieldable means urging said friction wheel against said friction drive wheel.

3. An automobile service indicator comprising a casing, a face plate on the casing, a plurality of numbered discs journaled in the casing, a friction wheel, a friction drive wheel, a shaft journaled in the casing, a balance wheel on the shaft, and gear means connecting said shaft and said friction drive wheel whereby said numbered discs are rotated, said numbered discs being visible under a legend on said face plate, and yieldable means urging said friction wheel against said friction drive wheel, said means comprising an arm, a spring secured to said arm engaging the friction wheel shaft.

4. An automobile service indicator comprising a casing, a face plate on the casing, a plurality of numbered discs in the casing, a shaft on which the discs are journaled, a friction wheel secured to said shaft, a friction drive wheel, a manually actuated shaft in the casing, gear means connecting said shaft and said friction drive wheel whereby said numbered discs are rotated, said numbered discs being visible under a legend on the face plate, an arm pivotally mounted adjacent said first named shaft and adapted to bear against said shaft, a spring secured to said arm whereby the arm is yieldably urged against the shaft to press the friction wheel and friction drive wheel together.

In testimony whereof, we affix our signatures.

JOHN PERCY STEVENS.
GEORGE A. C. BAILEY.